(12) United States Patent
Skvorecz

(10) Patent No.: US 9,539,677 B2
(45) Date of Patent: Jan. 10, 2017

(54) LOW COST WIRE CHAFING STAND AND METHOD

(76) Inventor: Robert John Skvorecz, Kinnelon, NJ (US)

(*) Notice: Subject to any disclaimer, the term of this patent is extended or adjusted under 35 U.S.C. 154(b) by 586 days.

(21) Appl. No.: 13/477,440

(22) Filed: May 22, 2012

(65) Prior Publication Data

US 2013/0313211 A1    Nov. 28, 2013

(51) Int. Cl.
| | | |
|---|---|---|
| *B23P 17/04* | (2006.01) | |
| *B65D 6/08* | (2006.01) | |
| *B65D 21/04* | (2006.01) | |
| *A47J 36/24* | (2006.01) | |
| *A47J 36/26* | (2006.01) | |

(52) U.S. Cl.
CPC ............... *B23P 17/04* (2013.01); *A47J 36/24* (2013.01); *A47J 36/26* (2013.01); *B65D 7/20* (2013.01); *B65D 21/046* (2013.01); *Y10T 29/49826* (2015.01)

(58) Field of Classification Search
CPC ............ B23P 17/04; A47J 36/24; A47J 36/26; B65D 7/20; B65D 21/046; Y10T 29/49826
USPC ......... 211/85.31, 126.7, 126.8, 126.9, 133.5, 211/188, 194, 181.1; 206/513; 220/491; 248/153
See application file for complete search history.

(56) References Cited

U.S. PATENT DOCUMENTS

| | | |
|---|---|---|
| 215,180 A | 5/1879 | Stiles |
| 983,473 A | 2/1911 | Barnes |
| 1,485,852 A | 3/1924 | Jarvis |
| 1,688,846 A | 10/1928 | Andrews |
| 1,947,932 A | 2/1934 | Fante |
| 2,007,997 A | 7/1935 | Abernethy |
| 2,110,726 A | 3/1938 | Harvey |
| 2,190,065 A | 2/1940 | Griffin |
| 2,269,425 A | 1/1942 | Bitney |
| 2,673,053 A | 3/1954 | Kilian |
| 2,739,466 A | 3/1956 | Maliniak |
| D181,149 S | 10/1957 | Hoffstein et al. |
| 2,837,624 A | 6/1958 | Katzman et al. |
| 2,838,198 A | 6/1958 | Vidal |
| D189,469 S | 12/1960 | Fischer |
| 2,979,242 A | 4/1961 | Van Huis et al. |
| 3,160,308 A | 12/1964 | Hare et al. |
| 3,276,733 A | 10/1966 | Rosser |
| 3,305,125 A | 2/1967 | Chesley |
| D213,899 S | 4/1969 | Rickmeier, Jr. |
| 3,435,958 A * | 4/1969 | Chesley ............... A47F 5/0031 108/107 |
| 3,650,384 A | 3/1972 | Pegg |
| 3,848,748 A | 11/1974 | Ceccarelli |

(Continued)

*Primary Examiner* — Korie H Chan
(74) *Attorney, Agent, or Firm* — Michael J. Feigin, Esq.; Feigin & Fridman

(57) ABSTRACT

A wire chafing stand consisting of an upper rim composed of wire rod steel in a closed geometrical configuration having two lateral sides and two longitudinal sides adapted for placement of a chafer containing a food product, a lower rim of wire rod steel spaced apart from the upper rim and a plurality of straight wire legs arranged in pairs extending upright between the upper and lower rims with each pair of wire legs affixed to a lateral side of the upper rim on opposite sides thereof and with each wire leg in each pair disposed in close proximity to the longitudinal side of the upper rim adjacent thereto for forming a gap between the point of attachment of the wire leg and the centerline of the longitudinal side of the upper rim adjacent thereto of less than about 1¼" in dimension.

13 Claims, 4 Drawing Sheets

(56) References Cited

U.S. PATENT DOCUMENTS

| | | | |
|---|---|---|---|
| 3,939,980 A | | 2/1976 | King |
| 3,939,981 A | | 2/1976 | King |
| 4,025,013 A | | 5/1977 | Anantharaman |
| 4,079,836 A | * | 3/1978 | Von Stein et al. ............ 206/513 |
| 4,135,691 A | | 1/1979 | Wiesmann |
| D278,196 S | * | 4/1985 | Koves ........................... D6/465 |
| 4,557,200 A | | 12/1985 | Geschwender |
| 4,718,402 A | | 1/1988 | Fordyce |
| 4,899,722 A | | 2/1990 | Horewitch |
| 4,920,873 A | | 5/1990 | Stevens |
| 5,065,735 A | | 11/1991 | Bourgeois et al. |
| 5,282,458 A | | 2/1994 | Trimble |
| 5,287,800 A | | 2/1994 | Orednick |
| 5,301,909 A | | 4/1994 | Chang |
| 5,503,062 A | | 4/1996 | Buff, IV |
| 5,819,640 A | | 10/1998 | Cuomo |
| D406,984 S | | 3/1999 | Skvorecz |
| 5,921,513 A | * | 7/1999 | Skvorecz ...................... 248/153 |
| 5,996,948 A | * | 12/1999 | Skvorecz ...................... 248/153 |
| 6,047,932 A | | 4/2000 | Skvorecz |
| 6,170,405 B1 | | 1/2001 | Weitzman et al. |
| 6,213,005 B1 | | 4/2001 | Sherman |
| 6,234,068 B1 | | 5/2001 | Sherman |
| 6,520,354 B1 | | 2/2003 | Skvorecz |
| D485,706 S | | 1/2004 | O'Connell Cooper et al. |

* cited by examiner

LOW COST WIRE CHAFING STAND AND METHOD

FIELD OF INVENTION

This invention relates to a low cost wire chafing stand and method of fabricating an inexpensive wire chafing stand which can be readily stacked in a nested relationship with other wire chafing stands of the same design for compact storage and low cost transportation and which possesses adequate strength and stability to satisfy minimum safety and reliability requirements.

BACKGROUND OF THE INVENTION

A chafing stand is a device used to support aluminum or steel pans and uses auxiliary fuel heaters preferably supported within the chafing stand for the purpose of maintaining and heating pre-cooked food at a location remote from the kitchen where the food was originally prepared and cooked. The primary factors controlling the selling price of a wire chafing stand are: (a) fabrication cost attributable to labor, (b) the amount of wire rod used in the fabrication of the wire chafing stand and (c) the transportation cost for transporting the fabricated wire chafing stand from the point of manufacture to a distributor or purchaser. The costs attributable to labor can be substantially reduced by automating the fabrication to minimize human involvement. The amount of the wire rod can be minimized by using less wire rod and/or thinner wire rod. Lastly, the cost of transportation may be minimized by transporting a multiplicity of wire chafing stands in a nested relationship and disassembling them after shipment. However, a wire chafing stand must also have sufficient strength and stability to resist tilting and to resist collapsing in response to applied forces imposed when dispensing food from the wire chafing stand. Thus reliability, safety and strength must also be factored into the fabrication design and may offset any advantage realized by simply optimizing the primary factors.

Heretofore, one could minimize transportation cost by nesting the wire chafing stands together during transportation. However, nesting may cause wedging which would make it difficult to separate the wire chafing stands after they are nested together. This problem was addressed and overcome in U.S. Pat. No. 5,996,948 and in U.S. Pat. No. 5,921,513, the disclosures of which are herein incorporated by reference, by incorporating "offsets" either in the wire legs of the chafing stand or in the rim of the stand during the fabrication of the wire chafing stand.

The cost of fabrication attributable to labor may be optimized by automating the operation such that the plurality of wire legs are welded to each of the rims using automated welding equipment.

Prior art wire chafing stand were designed to resist tilting and to resist collapsing, in response to applied forces imposed when dispensing food from the wire chafing stand, by arranging the wire legs in a substantially U shaped configuration with the wire legs bridging the longer and shorter sides of both the upper and lower rims of the chafer. An alternative wire chafing stand is commercially available which employs straight wire legs extending upright between the upper and lower rims. However, additional wire members, hereinafter "wire or support rods", are used in this alternative design as support rods between the upper and lower rims to increase stability and to prevent the upper rim from collapsing due to the forces applied by the weight of the metal pans placed in the chafing stand before dispensing food. This arrangement increases the cost of wire rod. Moreover, the wire rod supports are welded between the upper and lower rims approximate the center of the chafer which makes it more difficult to withdraw or insert a canned fuel holder into the chafer.

The wire chafing stand of the subject invention employs an arrangement of wire rods which does not require wire support rods thereby substantially reducing cost. Instead, all of the wire rods function as wire legs without compromising strength or safety. This is accomplished by using an arrangement of wire legs attached only to the lateral sides of the chafing stand in a substantially upright configuration without use of support rods. It has been discovered that if the wire legs are attached to the wire chafing stand on its lateral sides at a location in very close proximity to its longitudinal sides the wire chafing stand can resist tilting of the wire chafing stand and will resist applied forces imposed when dispensing food from the wire chafing stand which without support rods may otherwise cause the stand to collapse. In accordance with the present invention "very close proximity" defines a space or gap of no more than about 1¼" in dimension from the weld to the centerline of the longitudinal sides and preferably less than about ¾" in dimension to the centerline of the longitudinal sides.

The wire chafing stand of the present invention consists of at least one rim in a closed configuration having lateral and longitudinal sides, preferably forming a rectangular geometry, and a plurality of wire legs affixed to only the lateral sides of the rim on opposite sides thereof in close proximity to the longitudinal sides so as to form a gap of less than about 1¼" in dimension to the centerline of the longitudinal sides. For purposes of the present disclosure, the shorter side of the wire chafing stand represents the lateral side and the longitudinal side represents the longer side. In the preferred construction, the wire chafing stand includes an upper rim and a lower rim and a total of four wire legs, arranged in pairs, with a pair of wire legs connected to one lateral side of the upper rim on each opposite side thereof. Each wire leg should extend below the lower rim in a bent configuration to form a base member having a section level with the ground for supporting the wire chafing stand above ground.

The wire legs in each pair are in parallel to one another and in a substantially upright configuration with each leg being tilted in a horizontal direction and welded out of plane so that each leg bridges the upper rim to the lower rim. This accommodates a lower rim with dimensions substantially smaller then the corresponding dimensions of the upper rim.

At least one offset should be located in each wire leg and preferably at a location below the lower rim adjacent the lateral side thereof.

SUMMARY OF THE INVENTION

The wire chafing stand of the present invention includes at least one rim having lateral and longitudinal sides in a closed configuration and consists of a plurality of wire legs affixed to only the lateral sides of the rim on opposite sides of the chafing stand with each wire leg located in close proximity to the longitudinal sides thereof such that a gap is formed of no more than about 1¼" in dimension measured from the point where the wire legs are affixed to the rim to the centerline of the longitudinal sides. Each wire leg should extend from the upper rim to form a base member for supporting the chafing stand above ground level. At least one offset should be located in each wire leg. In the preferred embodiment the wire chafing stand includes an upper and a lower rim with each of the wire legs welded to both the upper and lower rims on only the lateral sides of the chafing stand and with each wire leg being located in a common plane lying at a small angle relative to a vertical plane extending transverse to the lateral sides.

BRIEF DESCRIPTION OF THE DRAWINGS

Other advantages of the present invention will become apparent from the following detailed description of the invention when read in conjunction with the accompanying drawings of which.

DETAILED DESCRIPTION OF THE INVENTION

Figure 1:
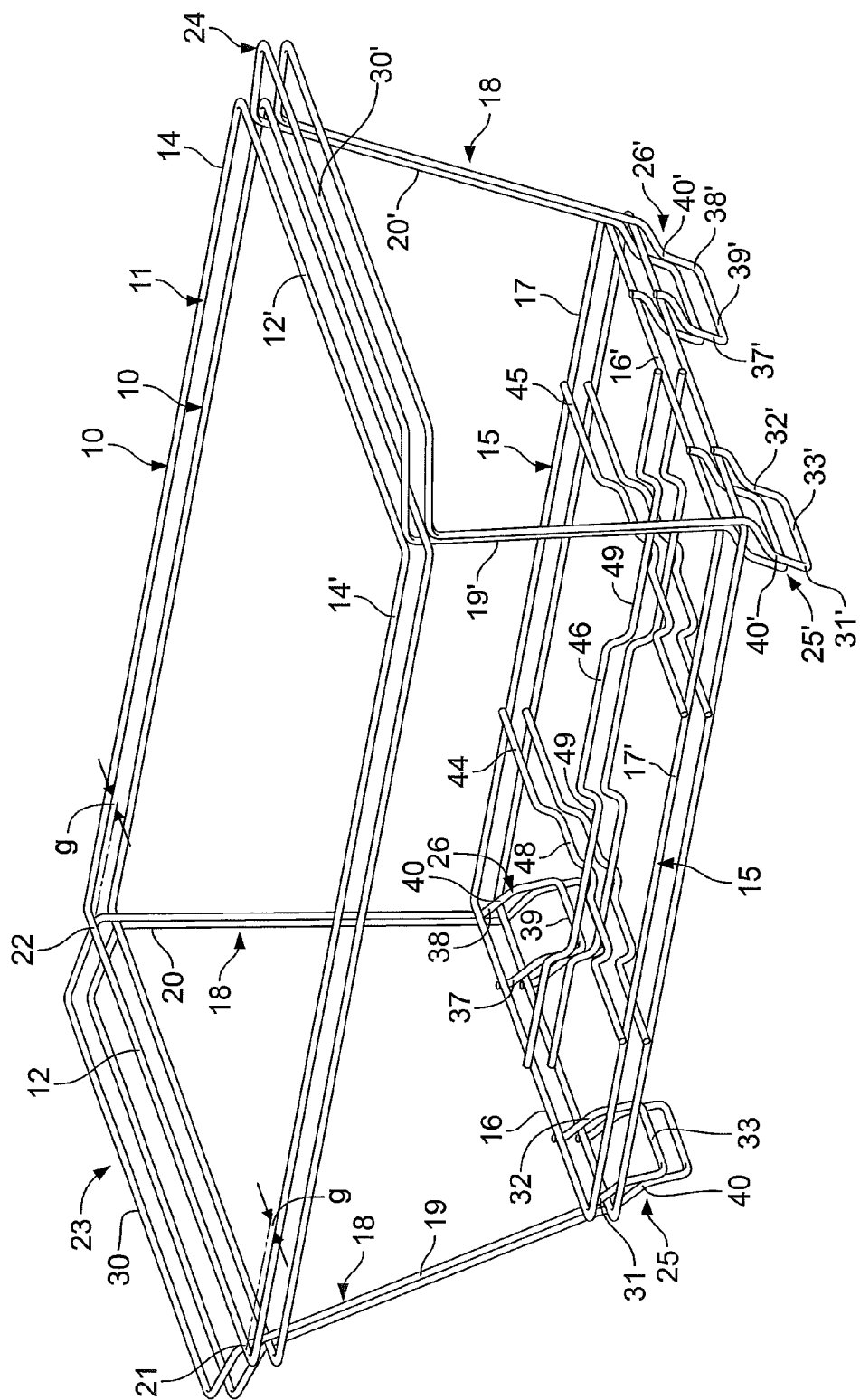
FIG. 1 is an isometric view of a pair of wire chafing stands nested together with each chafing stand having a plurality of wire legs affixed to only the lateral sides of the chafing stand with the plurality of wire legs shown welded to both the upper and lower rims to form a gap "g" of no more than about 1¼" in dimension to the centerline of the longitudinal sides and with the wire legs interconnected on each lateral side to form a handle.

Referring now to the drawings in which FIGS. 1-4 represent the preferred embodiment of the present invention showing two wire chafing stands 10 nested together with each wire chafing stand 10 being substantially identical in construction.

Each wire chafing stand 10 of the present invention comprises an upper rim 11 composed of wire rod steel in a closed geometrical configuration having two lateral sides 12 and 12' and two longitudinal sides 14 and 14' adapted for the placement of a chafer containing a food product. The lateral sides 12 and 12' lie substantially transverse to the longitudinal sides 14 and 14' to circumscribe an open substantially rectangular surface area geometry. The upper rim 11 is spaced apart from a lower rim 15. The lower rim 15 has geometry substantially identical to the geometry of the upper rim 11 and includes two lateral sides 16 and 16' and two longitudinal sides 17 and 17', the dimensions of which are proportionally smaller than the lateral and longitudinal dimensions of the upper rim 11.

Each wire chafing stand 10 further comprises a plurality of wire legs 18 joined, preferably by welding, to both the shorter lateral sides 12 and 12' of the upper rim 11 and to the shorter lateral sides 16 and 16' of the lower rim 15 on each opposite side of the chafing stand 10. The plurality of wire legs 18 preferably includes a first pair of wire legs 19 and 20 joined to the lateral side 12 of the upper rim 11 and to the lateral side 16 of the lower rim 15 and a second pair of wire legs 19' and 20' joined to the opposite lateral sides 12', 16' of the upper and lower rims 11 and 15 respectively. The first pair of wire legs 19 and 20 are welded to the upper rim 11 so that each of the welded connection 21 and 22 lies in close proximity to the longitudinal sides 14 and 14' on the lateral side 12 of the upper rim 11 such that a gap or space "g" is formed between the welded connections on the lateral sides of the upper rim relative to the longitudinal sides respectively corresponding to a distance of above zero and no more than about 1¼" in dimension to the centerline of the longitudinal sides and preferably less than ¾" in dimension. Likewise, the second pair of wire legs 19' and 20' are welded to the upper rim 11 on the opposite lateral side 12' in close proximity to the longitudinal sides 14 and 14' of the upper rim 11.

Each pair of wire legs 19 and 20 and 19' and 20' on each lateral side of the upper rim 11 are preferably interconnected to one another to form handles 23 and 24 to grip the wire chafing stand 10 on each opposite lateral side of the chafing stand 10. The handles 23 and 24 extend outwardly from the welded connections 21, 22 with each of the handles 23, 24 having a straight section 30, 30' lying parallel to the lateral sides 12, 12' of the upper rim 11. The handles 23, 24 may be formed independent of the wire legs or without being interconnected thereto.

The pair of wire legs 19, 20 extend from the lateral side 12 of the upper rim 11 to below the lower rim 16 to form base members 25 and 26. Similarly, the pair of wire legs 19', 20' extend from the lateral side 12' to below the lower rim 16' to form base members 25' and 26'. The base members 25, 25' and 26, 26' the wire chafing stand in an upright position above ground. Each base member 25, 26 and 25', 26' on each lateral side is preferably formed by bending the wire legs 19, 20 and 19', 20' below the lower rim 16 and 16', on each lateral side, into a configuration with each base member 25, 26 including two upright wire sections 31, 32 and 37, 38 and each of the base members 25' and 26' into two upright wire sections 31', 32' and 37', 38' respectively. The upright sections 31, 32 of base member 25 are aligned in parallel to one another and the upright sections 37, 38 of base member 26 are aligned in parallel to one another with each upright section 31, 32 and each of the upright sections 37 and 38 being welded a fixed distance apart to the lower rim on the same lateral side. Similarly the upright sections 31', 32' of base member 25' are aligned in parallel to one another and the upright sections 37', 38' of base member 26' are aligned in parallel to one another with each upright section 31', 32' and each of the upright sections 37' and 38' being welded a fixed distance apart to the lower rim 16' on the opposite lateral side of the chafing stand 10. Each base member 25 and 26 also has a straight wire section 33 and 39 interconnecting the two upright sections and lying horizontal to the ground. Similarly, each base member 25' and 26' on the opposite lateral side of the chafing stand includes a straight wire section 33' and 39' interconnecting two upright sections and lying horizontal to the ground. The straight wire sections 33, 39 and 33', 39' of each of the base members 25, 26 and 25', 26' form the support for the stand to rest upon the ground.

An offset 40 is located in each of the upright sections 31, 32, 37 and 38 on one lateral side of the chafing stand and a similar offset 40' located in each of the upright sections 31', 32', 37' and 38' on the opposite lateral side of the chafing stand 10. Each offset may be formed by a bending or crimping operation of the wire leg in which the offset is created to form an indent which will cause a lateral displacement between the longitudinal axis extending through the section of the wire leg above and below the indent. At least one offset is required in each wire leg 18 of the chafing stand 10.

Figure 2:
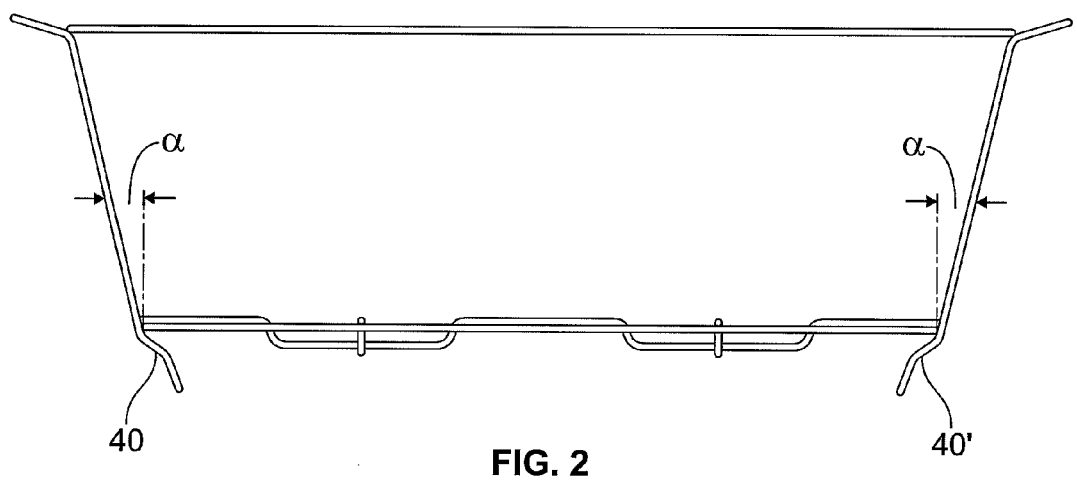
FIG. 2 is a front view of one of the wire chafing stands shown in FIG. 1 with the wire legs shown extending from the upper rim to below the lower rim and with an offset shown located in each wire leg just below the point of connection of the wire leg to the lower rim.
Figure 3:
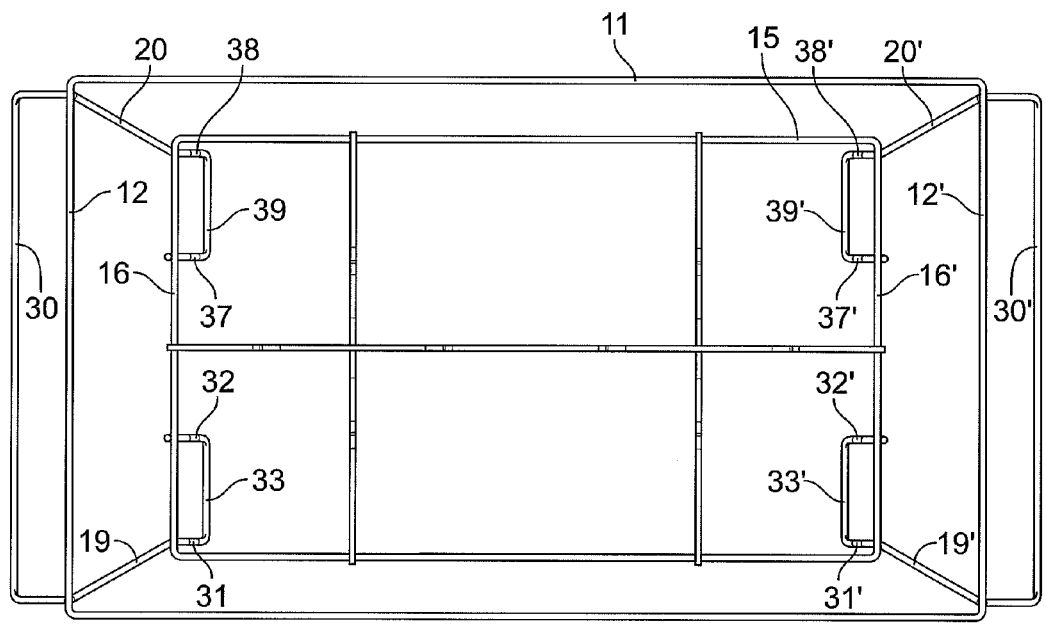
FIG. 3 is a top view of one of the wire chafing stands in FIG. 1 showing the wire legs and handle as an integral unit on each opposite lateral side of the wire chafing stand and showing the wire legs extended below the lower rim to form a plurality of base members on each lateral side with each base member comprising at least two upright straight wire sections aligned in parallel to one other and interconnected to a straight wire section lying level with the ground.
Figure 4:
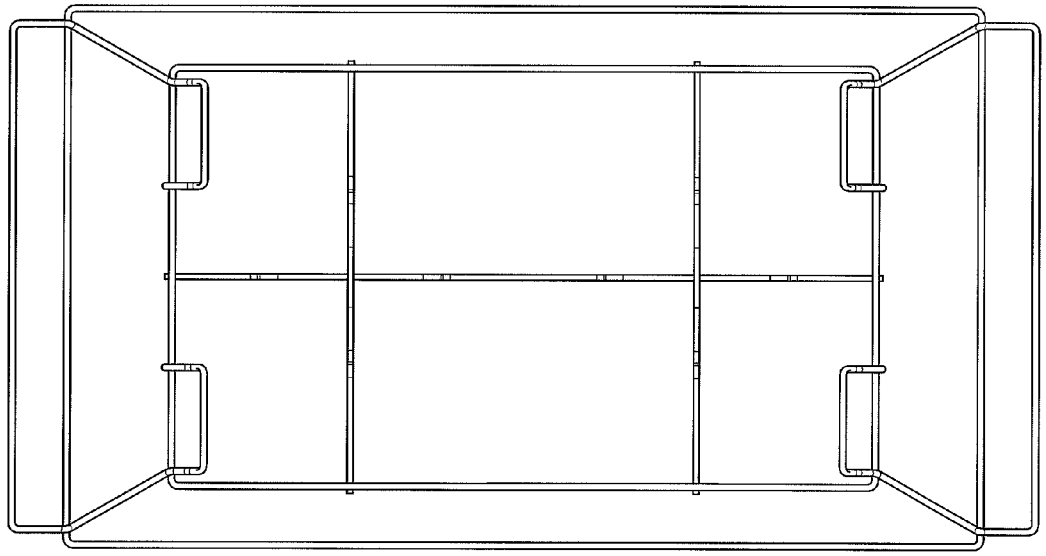
FIG. 4 is a bottom view of the wire chafing stand similar to that of FIG. 3.

The pair of wire legs 19, 20 and 19', 20' are welded to each lateral side 12 and 12' of the upper rim 11 and to the lateral sides 16, 16' of the lower rim 15 with the pair of wire legs 19, 20 and the pair of wire legs 19', 20' lying in common planes at a common angle "a" as shown in FIG. 2 with respect to a vertical plane transverse to the upper and lower rims 11 and 15, respectively.

A plurality of wire connectors 44, 45 and 46 are welded to the lower rim 15 in an arrangement with each of the wire connectors 44, 45 and 46 being bent to form depressed intersecting sections 48 and 49 adapted to support chafing fuel heaters (not shown).

Figure 5:
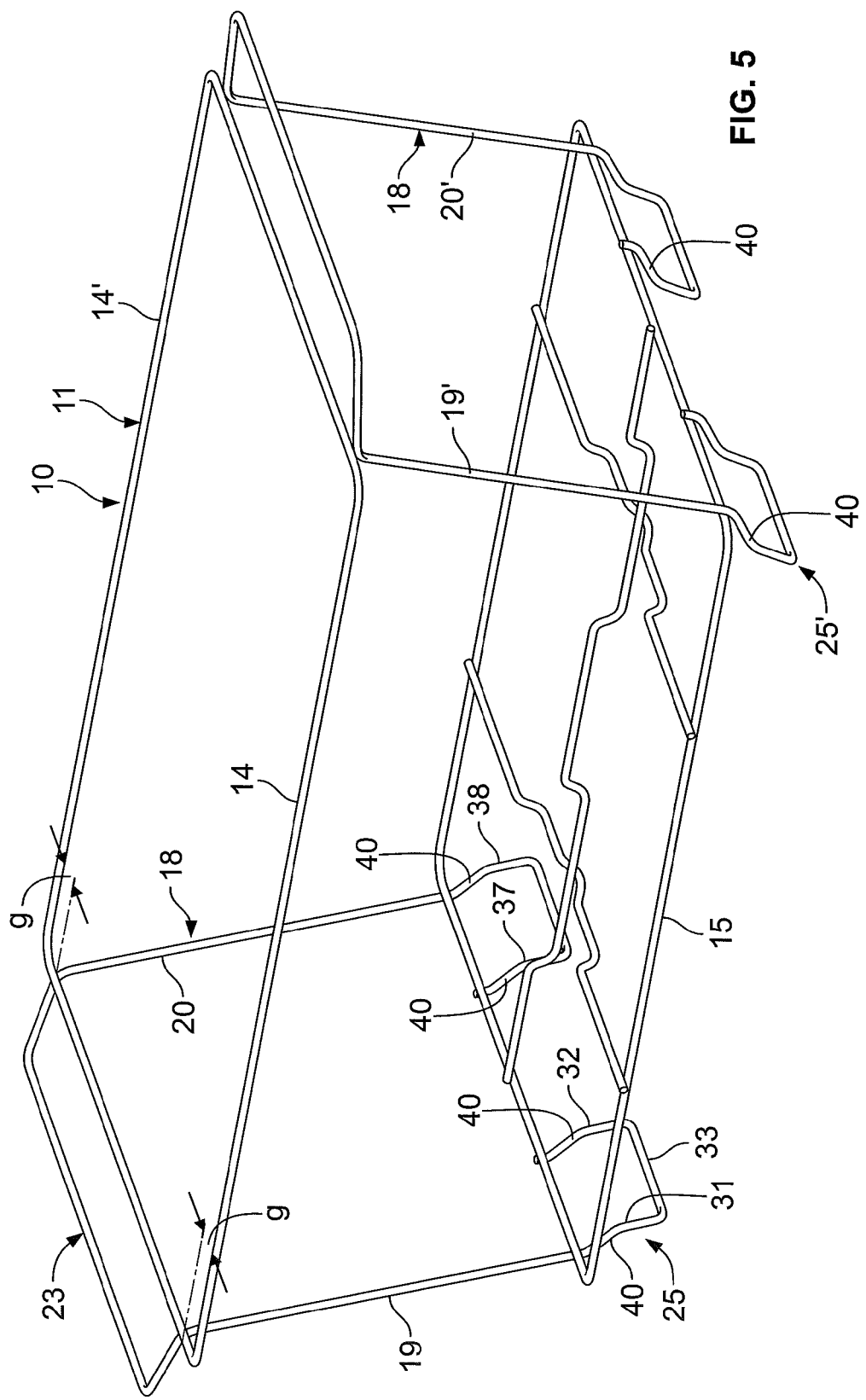
FIG. 5 is an isometric view of an alternative embodiment of the chafing stand shown in FIG. 1 with the plurality of wire legs shown welded to both the upper and lower rims to form a preferred gap of no more than about ¾" in dimension to the centerline of the longitudinal sides.

FIG. 5 represents an alternative embodiment of the invention with the chafing stand 10 constructed in a manner substantially identical to the construction of the chafing stand 10 in FIG. 1 except with regard to the location at which the wire legs 18 are welded to the longitudinal sides of the upper rim 11. Common reference numbers are used to identify the same elements. In FIG. 5, the gap "g" formed between each wire leg 19, 19' and 20, 20' with respect to the centerline of the longitudinal sides 14, 14' of the upper rim 11 is less than 3/4" in dimension.

What is claimed is:

1. A wire chafing stand comprising:
   an upper rectangular rim with a first and second shorter upper lateral side;
   a lower rectangular rim with a first and second shorter lower lateral side;
   a first wire leg portion formed from a single continuous wire including two extreme ends, said first wire leg portion comprising:
      two bend points which are each welded to said first shorter upper lateral side and spaced apart from one another;
      a handle parallel to said first shorter upper lateral side formed by two additional bends on said single continuous wire, said two additional bends positioned on said wire between said two bend points; and
      first and second legs, spaced apart from each other, each defined by;
         a first weld point connecting one of said two extreme ends of said single continuous wire to said first shorter lower lateral side of said lower rectangular rim;
         a first vertical portion extending downwardly from said first weld point;
         a second vertical portion welded to said first shorter lower lateral side of said lower rectangular rim at a second weld point; and
         a base extending between said first and second vertical portions parallel to said lower rectangular rim while being positioned inside an area defined by a footprint of said lower rectangular rim.

2. The wire chafing stand of claim 1, further comprising, for each of said first and second legs, an offset between said base and each of said first and second weld points.

3. The wire chafing stand of claim 1, wherein said two additional bends forming said handle are obtuse such that said handle is above a plane defined by said upper rectangular rim.

4. The wire chafing stand of claim 1, further comprising a second wire leg portion, identical to said first wire leg portion, attached to said second shorter upper lateral side and to said second shorter lower lateral side.

5. A wire chafing stand comprising:
   a lower rectangular rim including a first and a second shorter side;
   an upper rectangular rim disposed in a parallel plane to said lower rectangular rim;
   two base members formed from a continuous wire having two ends, each of said two ends of said continuous wire being welded to said lower rectangular rim at an end weld point;
   additional weld points connecting said continuous wire to said lower rectangular rim;
   upper weld points at which said continuous wire is welded to said upper rectangular rim; and
   a handle formed by a handle length of said continuous wire extending between said upper weld points;
   wherein each of said additional weld points is disposed along one of said first and second shorter sides of said lower rectangular rim between a corner of said lower rectangular rim and one of said end weld point,
   wherein each of said two base members includes a length of said wire defining a lower extremity parallel to said lower rectangular rim,
   wherein said continuous wire includes a first side length extending between one of said additional weld points and one of said upper weld points, and a second side length extending between another of said additional weld points and another of said upper weld points,
   wherein, along said continuous wire, said handle length is disposed between said first side length and said second side length, and
   wherein an angled offset is formed between each said base member of said two base members and a closest said additional weld point.

6. The wire chafing stand of claim 5, wherein said handle comprises an elongated parallel region, parallel to a side of said upper rim and comprises two acute bends at either end of said parallel region.

7. The wire chafing stand of claim 6, wherein said angled offset positions said two base members interior to an area defined by a footprint of said lower rim.

8. A wire chafing stand comprising:
   an upper rim;
   a rectangular lower rim; and
   two identical continuous wires, each including:
      exactly two upper attachment points at which said continuous wire is attached to said upper rim;
      exactly four lower attachment points at which said continuous wire is attached to said lower rim, said exactly four lower attachment points including two end points and two middle points; and
      a handle length of wire disposed between said two upper points, said handle length of wire forming a handle spaced apart from said upper rim;
   wherein each of said end points is at and end of said continuous wire, and
   wherein each of said middle points is disposed, along said lower rim, between one of said end points and a corner of said rectangular lower rim.

9. The wire chafing stand of claim 8, wherein said upper rim is rectangular, and wherein said upper and lower rims sit in planes parallel to one another.

10. The wire chafing stand of claim 8, wherein:
each said continuous wire includes two side lengths of wire, each extending between one of said middle points and one of said upper attachment points,
said handle is parallel to said upper rim,
said handle length of wire further comprises two bends on either side of said handle, and
each of said two bends being between said handle and a said side length of wire.

11. The wire chafing stand of claim 8, wherein a base, in parallel to said lower rim, is formed from said continuous wire between said end points and said middle points.

12. The wire chafing stand of claim 11, wherein said base is inside of an area defined by a footprint of said lower rim while said exactly four lower attachment points are located at an outside of said lower rim said area defined thereby.

13. The wire chafing stand of claim 11, wherein each said identical wire comprises two bases, and said bases are less distant from each other than a longest length of said lower rim.

* * * * *